UNITED STATES PATENT OFFICE.

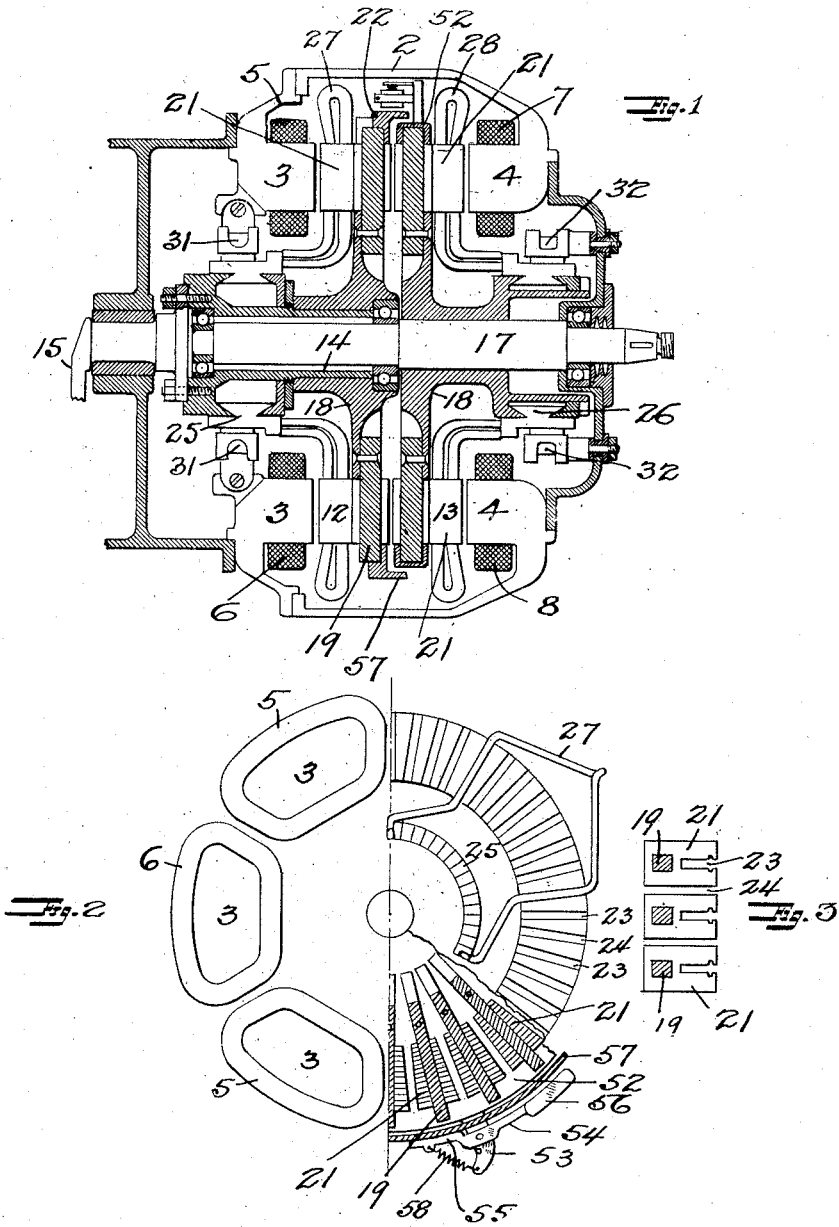

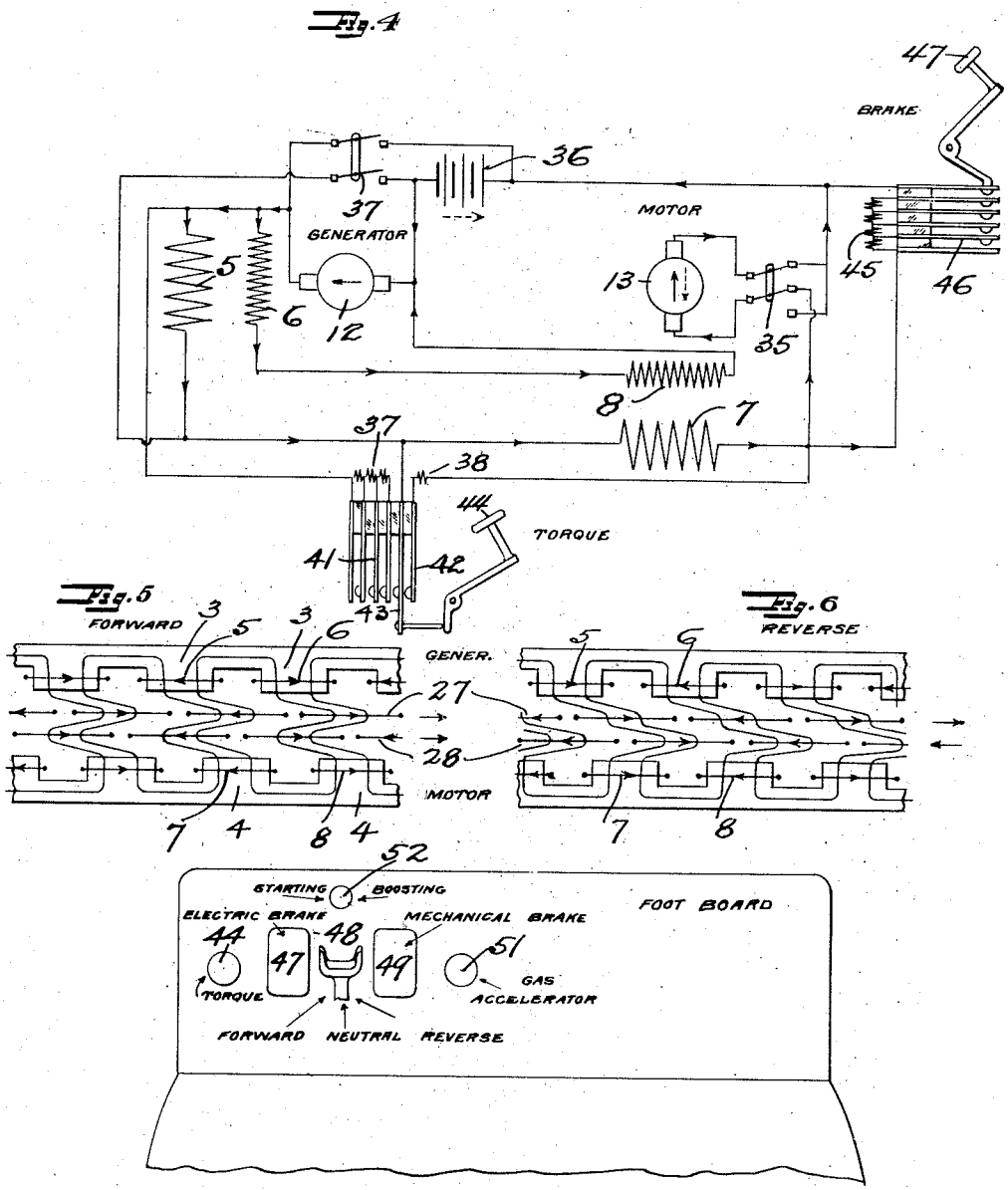

ALFONS H. NEULAND, OF SAN FRANCISCO, CALIFORNIA.

POWER-TRANSMISSION APPARATUS.

1,386,524.　　　　　Specification of Letters Patent.　　Patented Aug. 2, 1921.

Application filed February 19, 1917. Serial No. 149,461.

*To all whom it may concern:*

Be it known that I, ALFONS H. NEULAND, a subject of the Czar of Russia, and a resident of the city and county of San Francisco, State of California, have invented a certain new and useful Power-Transmission Apparatus, of which the following is a specification.

The invention relates to electric power transmission apparatus and particularly to such apparatus of the direct current type.

An object of the invention is to provide an electric power transmission apparatus which produces a greater torque on the driven element than that of the driving element or prime mover, which may rotate with or against the driver, which will charge a battery and crank the prime mover for the purpose of starting it and in which the speed of the driven element may exceed that of the driver.

A further object of the invention is to provide such a transmission apparatus which permits torque and speed changes within very wide limits and simple and effective regulating means for making these changes.

Another object of the invention is to provide a special arrangement of electric circuits and mechanical parts and a convenient arrangement of regulating means in conjunction with the use of the device on a motor vehicle.

A further object of the invention is to provide means for diminishing or eliminating surges and reversal of polarity in power transmission apparatus and a further object is to provide means for electric braking which is effective within wide speed limits.

The invention possesses other advantageous features, some of which with the foregoing, will be set forth at length in the following description where I shall outline in full that form of the invention which I have selected for illustration in the drawings accompanying and forming part of the present specification. In said drawings I have shown one specific form of my generic invention, but it is to be understood that I do not limit myself to such form, because the invention may be embodied in a multiplicity of forms, each constituting a species of my invention.

In said drawings:

Figure 1 is a longitudinal section, partly diagrammatic, of one form of the apparatus of my invention.

Fig. 2 is a diagrammatic cross section of the apparatus, showing on the left the field poles and on the right an armature, an armature coil and a section of commutator, a section through the armature and the clutch.

Fig. 3 is a development of a circumferential section of an armature, showing the armature laminations.

Fig. 4 is a diagrammatic representation of the electric circuits.

Fig. 5 is a diagram showing the magnetic circuits when the armatures rotate in the same direction.

Fig. 6 is a diagram showing the magnetic circuits when the armatures rotate in opposite directions.

Fig. 7 is a plan of the footboard of a motor vehicle showing the arrangement of the transmission-controlling devices thereon.

The power transmission apparatus of my invention is adapted for use in transferring power from one rotatable element to another, particularly from a prime mover to a driven element, in which it is desirable to vary the speed of the driven element with relation to the speeds of the prime mover. This renders the apparatus particularly adaptable for use in internal combustion engine propelled vehicles, for transferring the power from the engine to the driven shaft, but it is to be understood that its use is not confined to such employment. For the purpose of this specification, however, I shall describe its use in an automobile, since several of its functions are particularly advantageous to automobile conditions.

In my copending application Serial No. 72,663, filed in the United States Patent Office on January 18, 1916, I have shown how power may be transmitted from one shaft to another by means of two rotatable D. C. armatures in inductive relation to each other having stationary brushes on the commutators arranged in quadrature to each other and connected in series, so that each armature also acts as a series field for the other. In this way the driving armature directly exerts a torque on the driven armature.

I have further shown how a variable field fed by the D. C. generator armature is made to act on the driven armature, thereby amplifying its torque and causing it to rotate at various speeds.

In my copending application Serial No.

97,258 filed in the United States Patent Office on May 13, 1916, I have disclosed in addition to other features, a special arrangement of this transmission and shown how the torque of the prime mover may be transmitted partly electromagnetically and partly by means of a mechanical clutch without, however, requiring a clutch slippage. In the present invention I provide a second field arranged adjacent to and acting directly on the other armature, thereby permitting a wider range of speed and torque variation, producing better commutation, increasing the power capacity of the apparatus and permitting the production of a reverse torque. Speed and torque regulation is accomplished by relatively changing the strengths of the two fields acting on the armatures.

The apparatus comprises a stationary shell 2, having the field poles 3—4, preferably formed integral therewith, so that the shell and poles form a stationary element. The field poles 3 and 4 are arranged on opposite sides of the apparatus and the poles 3 are offset circumferentially with respect to the poles 4 as shown in Fig. 5, for reasons which will be hereinafter explained. The field poles 3 are provided with series field coils 5 and shunt field coils 6, and these coils are preferably alternately arranged on the successive poles, and field poles 4 are similarly provided with series field coils 7 and shunt field coils 8. Arranged between the field poles 3 and 4 are two direct current armatures 12 and 13, built up in the form of disks. The armature 12, which constitutes the driven or generator armature, is arranged adjacent and in inductive relation to the generator field poles 3 and the armature 13, which constitutes the driven or motor armature, is arranged adjacent to and in inductive relation with the motor field poles 4. The armatures are also arranged adjacent to and in inductive relation with each other. The generator armature 12 is secured to a sleeve 14 which is directly connected to the engine crank shaft 15 and armature 13 is secured to the driven shaft 17 which extends into the sleeve 14 and is provided with suitable bearings therein.

The armatures are similar in construction, each comprising a spider 18 provided with radial slots. Seated in the slots and secured to the spider are solid metallic bars 19, which project beyond the outer circumference of the spider or disk 18. On each of these bars are assembled a plurality of laminations 21, forming a plurality of radially extending, circumferentially spaced, laminated bars. These laminated bar sections are preferably co-extensive radially with the faces of the pole pieces 3 and 4 and the bars 19 preferably extend radially beyond the laminated sections. Surrounding the armature and tying the laminations together, is a split ring 22 which is preferably insulated. The laminations 21 are provided on the faces which are adjacent the pole pieces with slots 23 and the laminated sections 21 on the successive bars are spaced apart a distance equal to the width of the slots, thereby forming on the armature face twice as many slots as there are supporting bars 19. The slots 23 and the spaces 24 between the laminated sections serve as slots for the armature winding and the spaces 24 serve to create a high magnetic reluctance between different points on the armature and thereby cause the flux to travel from the field poles 3 through the two armatures 12 and 13 to the field poles 4.

The armatures 12 and 13 are respectively provided with commutators 25—26 and with armature windings 27—28 connected to the respective commutators. A set of stationary brushes 31 engage commutator 25 and a set of stationary brushes 32 engage commutator 26, and like the field poles, one set of brushes is offset with respect to the other.

Figs. 5 and 6 show the effect obtained by offsetting the generator brushes and field poles, with respect to the motor brushes and field poles. In these figures the field poles 3 and 4, the field coils 5, 6, 7 and 8 and the armature windings 27 and 28, are shown diagrammatically, the arrows on the windings and coils indicating the direction of the currents therein. The arrows to the right of the armature windings indicate the direction of rotation of the two armatures. The tortuous lines threading through the poles and armature windings indicate the paths of the fluxes. In Fig. 5, the two armatures rotate in the same direction, in the present instance producing forward movement of the vehicle, and in Fig. 6 the armatures rotate in opposite directions, producing a backward movement of the vehicle. It will be noted that each armature is acted on by two fields, one produced by the adjacent field coils and the other produced by the current in the other armature. The motor armature 13 when rotating either forward or backward, is acted on by the fields produced by the field coils 7 and 8 and the armature coils 27 and these two fields exert their pull in the same direction, producing a large torque on the motor armature.

This arrangement produces a device of great power and permits the carrying of large overloads without impairing commutation, which in motor vehicle practice is of great importance. The arrangement also permits speed and torque variations within wide limits by simply varying the relative strengths of the generator and motor fields.

Electrical power transmissions now in use and employing field control are limited to a relatively small field variation if commutation is not to become objectionable, since with an ordinary generator carrying full torque, the weakening of the field to half strength requires the armature to carry twice normal current, making the armature ampere turns four times greater than those of the field, under which conditions commutation is very poor. In the apparatus of the present invention, since each armature acts as a field for the other, it is possible not only to weaken the motor or the generator field, but to cut either of them out entirely without impairing commutation. Further, this arrangement permits the production of a strong reverse torque which is preferably obtained by reversing the direction of current in the motor armature, as shown in Fig. 6, wherein it is shown that the generator armature, while rotating in a direction opposite to that of the motor armature, nevertheless exerts a torque on the motor armature in the direction of rotation thereof.

From the above it will be apparent that the speed of the motor armature may be made to exceed the speed of the generator or driving armature by strengthening the generator field and weakening the motor field.

When the generator and motor fields are of equal strength, practically all of the flux will pass from the left poles through the armatures to the right poles.

When, however, the field strength of one set is greater than that of the other, the difference will be forced radially between the two armature windings radially through the sections and across the gaps formd by the armature laminations.

The electrical circuits of the apparatus and the control circuits and devices are shown in Fig. 4. The shunt field windings 6 and 8 are connected in series across the generator armature 12 and the series field windings 5 and 7 are connected in series with both armatures. The motor armature 13 is provided with a reversing switch 35 whereby the direction of the current in motor armature and the direction of rotation thereof may be reversed.

The apparatus also operates as a starter for the internal combustion engine and for this purpose a storage battery 36 is arranged in the main circuit or armature circuit. A two-pole switch 37 is provided for closing the starting circuit through the generator armature and the generator series field and this switch is also used for boosting the battery when the engine is operating and the car not in motion. During the time that the car is in motion, the battery is charging. After the engine is started, the starting switch is opened, and current from the generator armature passes to the motor armature and also energizes the series and shunt fields of both armatures. Means are provided for relatively varying the strengths of the two series fields, whereby the torque of the apparatus may be varied. The generator series field 5 and the motor series field 7 are each shunted by variable resistances and I prefer to employ one operating means which successively varies both fields. The resistances 37 and 38 are preferably connected to insulated ends of flexible contact fingers 41—42 which are movable into contact at their other ends to vary the resistances in the shunt circuits. In Fig. 4, the resistance 37 in the generator series field shunt are connected to the ends of the insulated contact fingers 41 and when these fingers are flexed by the main contact finger 43 which is connected to the other side of the series field, the resistance in the generator series field shunt is progressively lessened. The motor series field shunt is likewise connected to the contact fingers 43 and 42 and these fingers are normally in contact, shunting the motor series field. The contact finger 43 is flexed by a torque button 44, which when depressed first opens the motor series field shunt, then closes the resistance across the generator field and thereafter progressively cuts out the resistance in the generator series field shunt, thereby decreasing the strength of the generator series field and increasing the strength of the motor series field. The torque and speed difference between the armatures is greatest when one auxiliary field has full strength and the other is entirely cut out.

Means are also provided for electrically braking the automobile. Shunted across the motor armature is a circuit containing variable resistance 45, connected to similar flexible contact fingers 46, which are flexed by a brake pedal 47 to decrease the resistance in circuit. The circuit is normally open and when the pedal is depressed, the total resistance is first introduced into the circuit and then gradually cut out, short-circuiting the motor armature. The motor fields are excited by the generator armature and are therefore strong at all times and are practically independent of the speed of the motor armature, so that braking in various degrees is always obtainable regardless of the speed of the vehicle.

The reversing switch 35 is secured to a suitable pedal 48 which projects through the vehicle footboard and which is movable to open, forward or reverse positions of the switch. After the switch 35 has been moved to the desired operating position, the main electric circuit is not opened for purposes of control or braking and these operations are performed by manipulating the auxiliary circuits. The electric brake pedal 47 is preferably arranged to the left of the control pedal 48 and the mechanical brake pedal 49 to the right. The torque button 44 is preferably placed adjacent the electric brake pedal and the engine throttle button 51 is placed adjacent the mechanical brake. It is to be understood that the mechanical brake will find its principal use only in emergencies. The button 52 which controls the starting switch 37 is placed in a convenient location. After the engine has been started and it is desirable to start the automobile, the control pedal 48 is moved to its position of forward drive, the left foot is then swung to the left to depress the torque button, thereby creating high torque, and the right foot depresses the throttle button. As the speed increases the torque button may be raised to increase the speed of the driven element.

The arrangement of the shunt windings of the generator and motor prevents a reversal of the field polarity, keeps the machine magnetized at all times and thereby eliminates magnetic surges in the device.

Means are also provided for mechanically assisting in the transfer of power from the driving element to the driven element, when the driven element is being rotated at high speed and thereby relieve the electric mechanism of the additional load. This is accomplished by providing a clutch mechanism which is actuated at a predetermined speed of the driven element. The clamping ring 52, which binds into place the laminated sections of the driven armature 13, is provided at spaced intervals with posts 53 to which are fulcrumed clutch levers 54 which are provided on one end with a clutch face 55 and on the other end with a weight 56. The clutch face overlies a shoulder 57 on the clamping ring 22 and is normally held from contact with said shoulder by a spring 58. The centrifugal force of the weight, at high speeds of the driven armature, overcomes the tension of the spring and presses the clutch face against the shoulder 57, thereby transferring a portion of the power mechanically. It is to be understood that the driven shaft 17 upon which the driven armature 13 is fixed, is connected to the driving gear of the automobile so that the speed of the driven armature is proportionate to the speed of the vehicle.

In some instances it may be desirable to change the relation between the two sets of field poles, or the relation between the two sets of brushes from the relation indicated in the drawings in order to obtain various characteristics of the apparatus.

I claim:

1. In an electric power transmission apparatus, a driving armature, a driven armature in inductive relation therewith, a field structure coöperating with said driving armature and a field structure coöperating with said driven armature.

2. In an electric power transmission apparatus, a driving armature, a driven armature in inductive relation therewith, a set of field poles coöperating with said driving armature, a set of field poles coöperating with the driven armature and means for varying the magnetic flux through one set of field poles.

3. In an electric power transmission apparatus, a driving armature, a driven armature in inductive relation therewith, a set of field poles coöperating with said driving armature, a set of field poles coöperating with the driven armature, and means for relatively varying the strengths of the two fields.

4. In an electric power transmission apparatus, a driving armature, a driven armature in inductive relation therewith and connected in series therewith, a field structure coöperating with said driving armature, and a field structure coöperating with said driven armature.

5. In an electric power transmission apparatus, a driving armature, a driven armature in inductive relation therewith and connected in series therewith, a field structure coöperating with said driving armature, a field structure coöperating with said driven armature and means for relatively varying the strengths of the two fields.

6. In an electric power transmission apparatus, means for producing a field, a driving armature coöperating with said field to form a generator, means for producing a second field, and a driven armature coöperating with said second field to form a motor, said armatures being in inductive relation to each other, whereby the current in each armature produces a torque on the other.

7. In an electric power transmission apparatus, means for producing a field, a driving armature coöperating with said field to form a generator, a driven armature connected in series with the driving armature and arranged in inductive relation therewith, and means for producing a second field coöperating with said driven armature to form a motor.

8. In an electric power transmission apparatus, a driving armature, a driven armature in inductive relation therewith, a set of field poles coöperating with the driving armature, series and shunt field windings on said poles, a second set of field poles coöperating with the driven armature and series and shunt field windings on said second set.

9. In an electric power transmission apparatus, a driving armature, a driven armature in inductive relation therewith, a set of field poles coöperating with the driving armature, series and shunt field windings on said poles, a second set of field poles coöperating with the driven armature, series and shunt windings on said second set of field poles and means for relatively varying the currents in said series windings.

10. In an electric power transmission apparatus, a driving armature, a driven armature in inductive relation therewith, a set of field poles coöperating with the driving armature, series and shunt field windings on said poles, a second set of field poles coöperating with the driven armature, and series and shunt windings on said second set of field poles, the shunt windings of both sets of poles being connected across the driving armature.

11. In an electric power transmission apparatus, a driving armature, a driven armature in inductive relation therewith, a set of field poles coöperating with the driving armature, series and shunt field windings on said poles, a second set of field poles coöperating with the driven armature, and series and shunt windings on said second set of field poles, the shunt windings of both sets of poles being connected in series across the driving armature.

12. In an electric power transmission apparatus, a driving armature, a driven armature in inductive relation therewith, a set of field poles coöperating with said driving armature, and a second set of field poles coöperating with said driven armature, the field poles of one set being offset circumferentially with relation to the field poles of the other set.

13. In an electric power transmission apparatus, a driving armature, a driven armature in inductive relation therewith and connected in series therewith, a field structure coöperating with the driving armature, a field structure coöperating with the driven armature and means for reversing the direction of current in the driven armature.

14. In an electric power transmission apparatus, a driving armature, a driven armature in inductive relation therewith and connected in series therewith, a field structure coöperating with the driving armature, a field structure coöperating with the driven armature and a variable resistance shunting said driven armature.

15. In an electric power transmission apparatus, a driving armature, a driven armature in inductive relation therewith and connected in series therewith, a field structure coöperating with the driving armature, a field structure coöperating with the driven armature and means for varying the current in the driven armature with respect to the current in the driving armature.

16. In an electric power transmission apparatus, a driving armature, a driven armature in inductive relation therewith, a field structure coöperating with the driving armature, a second field structure coöperating with said driven armature, series field coils arranged on said structures and means for relatively varying the currents in said field coils.

17. In an electric power transmission apparatus, a driving armature, a driven armature in inductive relation therewith, a field structure coöperating with the driving armature, a second field structure coöperating with said driven armature, series field coils arranged on said structures and a circuit containing variable resistance shunting the field coils on the field structure coöperating with the driving armature.

18. In an electric power transmission apparatus, a driving armature, a driven armature in inductive relation therewith, a field structure coöperating with the driving armature, a second field structure coöperating with said driven armature, series field coils arranged on said structures and means for short-circuiting the field coils on the field structure coöperating with the driven armature.

19. In an electric power transmission apparatus, a driving armature, a driven armature in inductive relation therewith, a stationary field structure coöperating with the driving armature and a stationary field structure coöperating with the driven armature.

20. In an electric power transmission apparatus, a driving armature provided with a winding and commutator, stationary brushes engaging said commutator, a driven armature in inductive relation with said driving armature and provided with a winding and commutator, stationary brushes engaging said second commutator, said windings being connected in series through said brushes, a stationary field structure arranged adjacent the driving armature and a stationary field structure arranged adjacent the driven armature.

21. In an electric power transmission apparatus, two rotatable armatures in inductive relation, a field element for producing a field acting on one armature and a field element for producing a field acting on the other armature.

22. In an electric power transmission apparatus, two rotatable armatures in inductive relation and conductively connected, and field structures for producing two magnetic fields coupling the two armatures.

23. In an electric power transmission apparatus, a driving armature provided with a winding, a driven armature provided with a winding, the armatures being in inductive relation, stationary field elements arranged adjacent said armatures and windings on said field elements, the windings of the two armatures and of the field elements being electrically connected.

24. In an electric power transmission apparatus, a disk-shaped driving armature, a disk-shaped driven armature coaxial with and in inductive relation with the driving armature, a circular field structure coöperating with the driving armature, and a circular field structure coöperating with the driven armature.

25. In an electric power transmission apparatus, a driving armature provided with a winding, a driven armature provided with a winding, the armatures being in inductive relation, a field structure in coöperative relation with said driving armature, a second field structure in coöperative relation with said driven armature and means for varying the torque of the driven armature with respect to the torque of the driving armature.

26. In an electric power transmission apparatus, a driving armature, a driven armature in inductive relation therewith, means for producing a current in the driving armature whereby a torque is exerted on the driven armature and a field structure arranged adjacent the driven armature adapted to exert a torque thereon in the same direction.

27. In an electric power transmission apparatus, a driving armature provided with a winding, a driven armature provided with a winding and in inductive relation with the driving armature, the said windings being connected in series, means for producing a flux acting on the driving armature whereby rotation thereof generates a current in the winding thereof, which current produces a flux which exerts a torque on the driven armature, and a field structure arranged adjacent the driven armature and producing a flux which exerts a torque on the driven armature in the same direction.

28. In an electric power transmission apparatus, a driving armature, a driven armature in inductive relation therewith, a set of field poles coöperating with the driving armature, a second set of field poles coöperating with the driven armature, field windings on both of said sets of field poles and means for varying the current in one of said windings.

29. In an electric power transmission apparatus, a driving armature, a driven armature in inductive relation therewith, field poles coöperating with the driving armature, field poles coöperating with the driven armature, a field winding on said last-named poles connected to the driving armature and means for reversing the direction of current in the driven armature.

30. In an electric power transmission apparatus, a driving armature provided with a winding and commutator, a set of stationary brushes engaging said commutator, a driven armature provided with a winding and commutator, said armatures being in inductive relation with each other, a set of stationary brushes engaging the second commutator, one set of brushes being offset circumferentially with respect to the other, a set of field poles coöperating with the driving armature and a set of field poles coöperating with the driven armature, one set of field poles being offset circumferentially with respect to the other set of field poles.

31. In an electric power transmission apparatus, a generator armature and a motor armature, each acting as the field for the other, a stationary field structure coöperating with the generator armature and a stationary field structure coöperating with the motor armature.

32. In an electric power transmission apparatus, a generator armature and a motor armature, each acting as the field for the other, auxiliary fields acting on each armature and means for relatively varying the strengths of the two auxiliary fields.

33. In an electric power transmission apparatus, a generator armature and a motor armature, each acting as the field for the other, a set of field poles coöperating with the generator armature, a set of field poles coöperating with the motor armature and windings on both sets of poles connected to the generator armature.

34. In an electric power transmission apparatus, a generator armature and a motor armature, each acting as the field for the other and being connected in series and auxiliary fields acting on each armature.

35. In an electric power transmission apparatus, a generator armature and a motor armature, each acting as the field for the other, a set of field poles coöperating with the generator armature, and a set of field poles coöperating with the motor armature, one set of field poles being offset circumferentially with respect to the other set.

36. In an electric power transmission apparatus, a driving shaft, a disk armature secured to said shaft, a driven shaft alined with said driving shaft, a disk armature secured to the driven shaft and arranged in inductive relation with said first-named armature, a field structure arranged on that side of the first armature remote from the second armature and a second field structure arranged on that side of the second armature remote from the first armature.

37. In an electric power transmission apparatus, a driving shaft, a disk armature secured to said shaft, a driven shaft alined with said driving shaft, a disk armature secured to the driven shaft and arranged in inductive relation with said first-named armature, a field structure arranged coaxially with and in inductive relation with the first armature and a second field structure arranged coaxially with and in inductive relation with the second armature.

38. In an electric power transmission apparatus, a driving shaft, a disk armature secured to said shaft, a driven shaft alined with the driving shaft, a disk armature secured to said driven shaft, a plurality of laminated sections on the driving armature, a plurality of laminated sections on the driven armature, the sections being equally disposed radially from the axis of the armatures and field poles similarly disposed radially arranged adjacent the two armatures.

39. In an electric power transmission apparatus, a generator armature, a motor armature connected in series therewith, and in inductive relation with the generator armature, a series field winding for the generator armature, a series field winding for the motor armature connected to the generator armature, a variable resistance circuit connected across the generator field winding and a foot button for varying the resistance in said circuit.

40. In an electric power transmission apparatus, a generator armature, a motor armature in inductive relation therewith, a series field winding for the generator armature and a series field winding for the motor armature, a circuit containing resistance connected across the generator field winding, a circuit connected across the motor field winding and unitary means for opening the latter circuit, closing the former circuit through the resistance and varying the resistance.

41. In an electric power transmission apparatus, a generator armature, a motor armature in inductive relation therewith, a series field winding for the generator armature and a series field winding for the motor armature, a circuit containing resistance connected across the generator field winding, a circuit connected across the motor field winding and unitary means for controlling both circuits.

42. In an electric power transmission apparatus, a generator armature, a motor armature in inductive relation therewith, a series field winding for the generator armature and a series field winding for the motor armature, a circuit containing resistance connected across the generator field winding, a circuit connected across the motor field winding, means for controlling said circuits, a circuit connected across the motor armature and means for varying the resistance of said last-named circuit.

43. In an electric power transmission apparatus for internal combustion engine propelled vehicles, a generator armature, a motor armature in inductive relation therewith, a generator field winding, a motor field winding, a circuit connected across the generator field winding, a circuit connected across the motor field winding, a button for controlling said circuits whereby the relative strengths of the two fields are varied, a circuit connected across the motor armature and a button for controlling said last-named circuit.

In testimony whereof, I have hereunto set my hand at San Francisco, California, this 14th day of February 1917.

ALFONS H. NEULAND.

In presence of—
H. G. PROST.